United States Patent Office 3,161,404
Patented Dec. 15, 1964

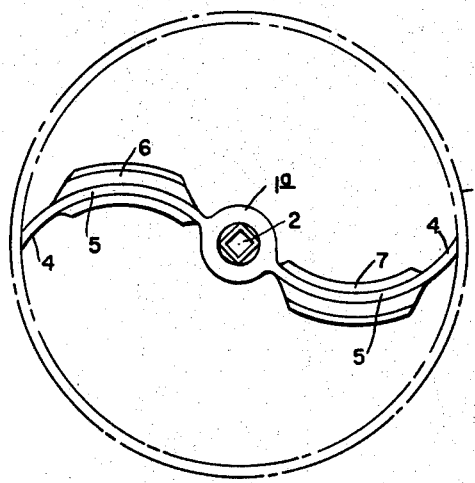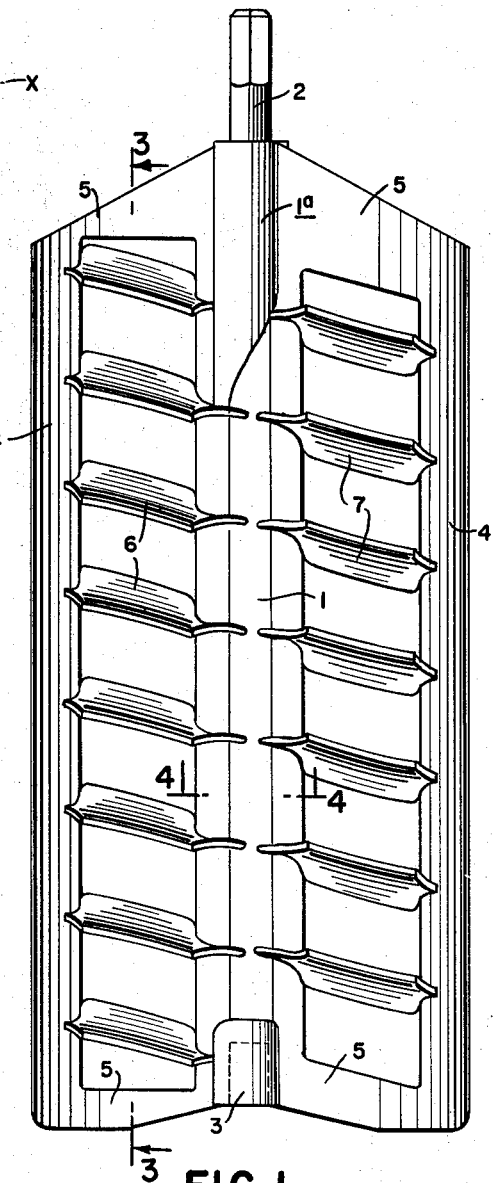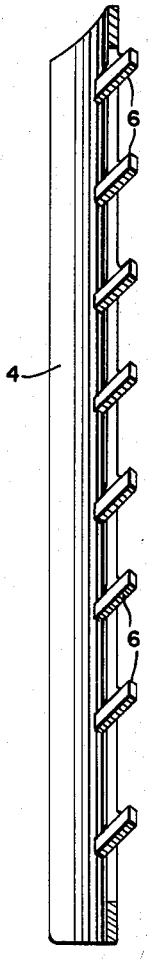

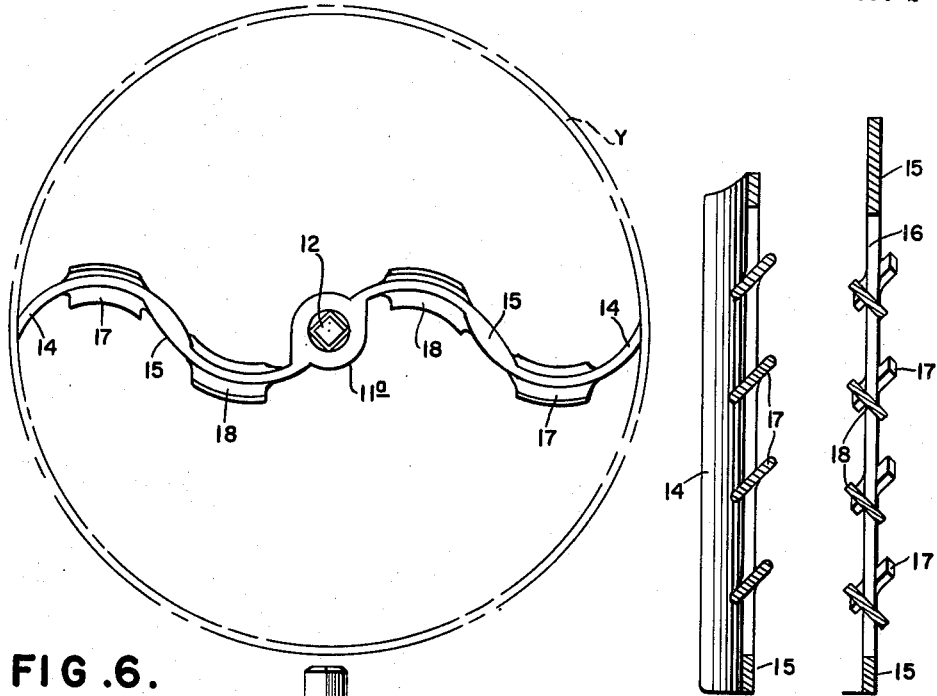
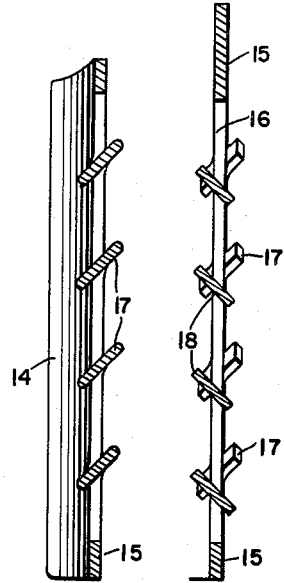
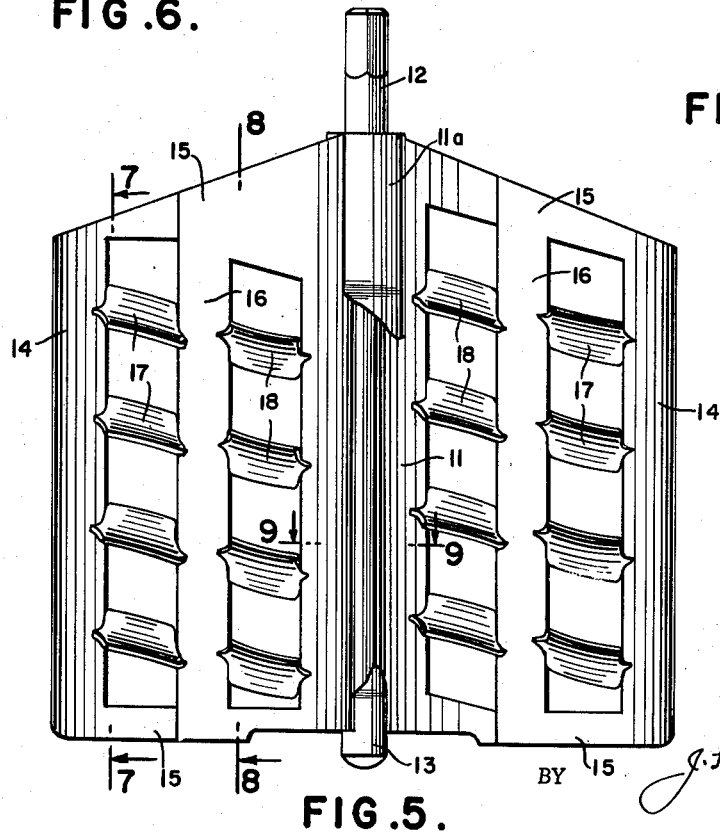

3,161,404
ICE CREAM FREEZER BEATERS
Frederic C. Jay, Richmond, Va., assignor to Richmond Cedar Works Manufacturing Corporation, Richmond, Va., a corporation of Virginia
Filed Apr. 24, 1963, Ser. No. 275,268
1 Claim. (Cl. 259—134)

This invention relates to ice cream freezers of the usual rotary type, and more particularly to an improved stirrer or beater for such freezers.

The conventional rotary beater which has been in use for many years, is formed of cast metal, and comprises a vertical shaft or spindle carrying radially disposed beater blades, usually made of wood, pivotally mounted at the ends of arms extending from said shaft, and arranged to engage the inner surface of the can or container in which the material to be frozen is placed.

The general object of the invention is to provide a beater of this general character formed of one integral piece, preferably molded from suitable plastic, and in which the scraper blades are rigidly connected with the arms and are also rigidly connected with said beater blades.

A specific object is to provide a beater of this type which will produce a much better scraping stirring and agitating action than the conventional beaters above referred to.

A still more specific object of the invention is to devise a beater of this general type in which two vertical series of beater blades are provided, disposed at the same side of but at different radial distances from the axis of rotation, and transversely inclined in opposite directions, this compound arrangement of blades resulting in the production of an exceptionally smooth and superior frozen material.

In order that the invention may be readily understood, reference is had to the accompanying drawings, illustrating two different modifications of the invention, such drawings forming a part of this specification, and in which:

FIG. 1 is a side elevation of one form of my improved beater;

FIG. 2 is a plan view thereof, also showing in broken lines the outline of the can or container in which the beater works;

FIG. 3 is a vertical section on the line 3—3 of FIG. 1, looking in the direction of the arrows;

FIG. 4 is a transverse section on the line 4—4 of FIG. 1, looking in the direction of the arrows;

FIG. 5 is a side elevation of another form of the invention;

FIG. 6 is a plan view thereof, also showing in broken lines the outline of the can or container in which the beater works;

FIG. 7 is a vertical section on the line 7—7 of FIG. 5, looking in the direction of the arrows;

FIG. 8 is a vertical section on the line 8—8 of FIG. 5, looking in the direction of the arrows; and FIG. 9 is a transverse section on the line 9—9 of FIG. 5, looking in the direction of the arrows.

Referring to the drawings in detail, and more particularly first to FIGS. 1 to 4 thereof, my improved beater comprises a central, vertical column 1, preferably of relatively thin flat cross-section as shown in FIG. 4. The upper part of this column is advantageously cylindrical, as shown at 1ª, and into this cylindrical portion is set a short piece of shafting 2, having a squared upper end by which it may be turned. At the lower end, the column 1 is formed into a socket 3, adapted to rotatably be supported on a stud carried by the bottom of the freezer tub.

At the side edges of the beater are longitudinally extending members in the form of scraper blades 4, which are curved in opposite directions as shown in FIG. 2. These scraper blades 4 are rigidly connected, top and bottom, with the central column 1 by means of transversely extending members 5. The scraper blades are spaced from the column 1 in parallel relation therewith, and a set of transversely disposed beater blades 6 and 7 span the space between each longitudinally extending member or scraper blade and the central column. It will be particularly noted that each of these beater blades is rigidly connected at its ends with both the central column and one of the longitudinally extending members, the whole structure being preferably molded in one piece. It will be further noted that the beater blades 6 and 7 on opposite sides of the central column are not only set at reverse angles transversely of their length, but each pair of blades 6 and 7, one on each side of the central column, is inclined on a line extending transversely of the central column.

As the beater revolves, the blades 4 scrape the material from the inner surface of the can or container X and tend to move it toward the center, where the beater blades 6 and 7 keep it thoroughly agitated.

In FIGS. 5 to 9, I have illustrated a modified and preferred construction of beater which, while embodying some of the same principles as above described, is specifically different. It may be referred to as for a "squat" type freezer, that is, a freezer of relatively large diameter and small height.

In this type, as before, the beater comprises a central column 11, which, as shown in FIG. 9, is relatively wide and flat in cross-section. The upper portion is shown as cylindrical, and in this cylindrical portion is set a squared shaft 12 by which the beater may be turned. At the lower end of the central column is a trunnion 13, adapted to fit into a socket bearing carried by the bottom of the freezer tub. Thus the beater is rotatably supported by the shaft 12 and trunnion 13. A relatively thin, flat longitudinally extending member 16 is disposed at each side of the central column 11 and spaced therefrom in parallel relation thereto. A second longitudinally extending member 14 is disposed radially beyond each of said first longitudinally extending members in parallel relation therewith. Both said first and second longitudinally extending members are rigidly united, top and bottom, both to each other and to said central column, by transversely extending members 15.

The longitudinally extending members 14 constitute scraper blades adapted to engage the inner surface of the can or container Y in which the beater works. By reference to FIG. 6, it will be seen that these scraper blades are transversely curved in opposite directions, and have sharp edges.

Spanning the space between each longitudinally extending member 16 is a set of transversely disposed beater blades 17, rigidly united at their ends with both members, and spanning the space between each longitudinally extending member 16 and the central column 11 is a second set of transversely disposed beater blades 18. The blades of each set are disposed at an angle transversely of their own length, and the two sets of adjacent beater blades on the same side are set at opposite angles, as clearly shown in FIG. 8.

As shown in FIG. 6, the beater structure as a whole, on each side of the axis of rotation, as viewed endwise, is shaped with a double or reverse curvature, with the result that the member 16 is disposed almost tangentially with respect to these curves. Thus it is presented so as to slice through the material substantially edgewise, as the beater rotates. And the blades 17 tend to move the material in one direction, while the adjacent blades 18 tend to move it in the opposite direction, thus producing an exceptionally effective stirring or agitating action, resulting in an unusually smooth and uniform product.

What I claim is:

An ice cream freezer beater comprising a central column having at its ends means by which the beater may be rotatably supported and turned, a longitudinally extending member disposed at each side of said column and spaced therefrom in parallel relation therewith, a set of transversely disposed beater blades spanning the space between each said longitudinally extending member and said central column and rigidly secured to both, a second longitudinally extending member disposed radially beyond each of said first longitudinally extending members, and spaced therefrom in parallel relation, and a second set of transversely disposed beater blades spanning the space between each first and second longitudinally extending members, and rigidly secured thereto, said second longitudinally extending members serving as scraper blades, and the two adjacent sets of beater blades being set at opposite angles, the entire assembly of central column, first and second longitudinally extending members and beater blades constituting a structure of double curvature, as viewed endwise, and said first longitudinally extending members being relatively thin and wide and disposed almost tangentially with respect to this curvature.

References Cited by the Examiner

UNITED STATES PATENTS

| | | | |
|---|---|---|---|
| 3,254 | 9/43 | Johnson. | |
| 141,738 | 8/73 | Tilden. | |
| 223,753 | 1/80 | Packer | 259—134 |
| 231,847 | 8/80 | Puffer | 259—134 |
| 883,064 | 3/08 | Valerius. | |
| 1,334,748 | 3/20 | Gibbs. | |
| 2,252,043 | 8/41 | Sissel. | |

WALTER A. SCHEEL, *Primary Examiner.*

CHARLES A. WILLMUTH, *Examiner.*